United States Patent [19]

Lal

[11] 4,242,471
[45] Dec. 30, 1980

[54] SELECTIVELY CYCLIZED BLOCK COPOLYMERS

[75] Inventor: Joginder Lal, Akron, Ohio

[73] Assignee: The Goodyear Tire & Rubber Company, Akron, Ohio

[21] Appl. No.: 69,963

[22] Filed: Aug. 27, 1979

[51] Int. Cl.³ .................................................. C08F 8/48
[52] U.S. Cl. ............................... 525/333; 260/30.4 A; 260/33.6 A; 260/33.8 UA; 525/106; 525/153; 525/184; 525/330; 525/371
[58] Field of Search ............... 525/333, 371, 153, 184, 525/106, 330

[56] References Cited

PUBLICATIONS

"Polymer Chem. of Synthetic Elastomers," Chapter 10, Kennedy and Tornqvist, eds. (1969).

*Primary Examiner*—Stanford M. Levin
*Attorney, Agent, or Firm*—J. Y. Clowney

[57] ABSTRACT

There is disclosed a cyclized block copolymer having a molecular weight of from about 10,000 to about 300,000 comprised of at least two different blocks, at least one of which blocks is a cyclizable block derived from a conjugated diene monomer of the general structure

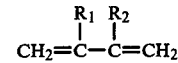

wherein, $R_1$ is selected from a hydrocarbyl group containing one to twelve carbon atoms, $R_2$ is selected from hydrogen or a hydrocarbyl group containing one to twelve carbon atoms; and at least one of which blocks is a non-cyclizable block derived from at least one member selected from the following classes of compounds:

(a) polymers of conjugated diene monomers of the general structure

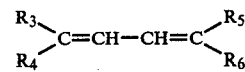

wherein:

$R_3$, $R_4$ and $R_5$ are the same or different and are selected from hydrogen or a hydrocarbyl group containing one to twelve carbon atoms; $R_6$ is selected from hydrogen, a hydrocarbyl group containing one to twelve carbon atoms or a cyano group, (b) polymers of α-methylstyrene, styrene, alkyl or aryl substituted styrenes or halogen substituted styrenes, (c) polymethacrylonitrile, polycaprolactam, polycaprolactone or polydimethylsiloxane, said cyclized blocks constituting about 5–95 weight percent of cyclized block copolymer and said non-cyclized blocks constituting about 95–5 weight percent of cyclized block copolymer.

16 Claims, No Drawings

SELECTIVELY CYCLIZED BLOCK COPOLYMERS

BACKGROUND OF THE INVENTION

This invention relates to thermoplastic block copolymers. Compositions of this invention are obtained by chemical modification of polymers containing at least two different blocks, at least one of which is derived from a suitable conjugated diene monomer defined hereafter. The polymers may contain other blocks derived from monomers such as styrene, t-butylstyrene, vinyl toluene, alpha-methylstyrene, 4-vinylbiphenyl, methacrylonitrile, and caprolactone.

Block copolymers such as polystyrene-polybutadiene-polystyrene(SBS) copolymers are well-known in the art (see U.S. Pat. No. 3,149,182, Canadian Pat. No. 746,555, and British Pat. No. 895,980).

It is also known that thermoplastic block copolymers such as the SBS copolymers behave as self-reinforced, vulcanized elastomers. The term "self-reinforced" means that the block copolymer has the stress-strain and other physical characteristics (apart from sensitivity to certain solvents) of vulcanized rubbers.

Block copolymers composed substantially of conjugated diene monomers, for instance, isoprene and butadiene, have properties resembling those of unvulcanized rubber. They are soft, tacky materials having very low tensile strength.

Self-reinforcing block copolymers prepared from diene block copolymers having the structure C-D-C wherein each C is a homopolymer of a branched chain conjugated diene and D is a homopolymer block of an unbranched (straight chain) conjugated diene are described in U.S. Pat. No. 3,452,118. That patent discloses a thermoplastic elastomer synthesized by selective hydrochlorination of a polyisoprene-polybutadiene-polyisoprene (IBI) block copolymer. Selective hydrochlorination of these diene block copolymers produced rubbery, high strength ("self-reinforcing") block copolymers. During this reaction, the polyisoprene block became hydrochlorinated while the central rubbery block was substantially unchanged (see also British Pat. No. 1,163,674).

Processes for preparing block copolymers from conjugated diene monomers and controlling the microstructure of the resultant polymers are disclosed in U.S. Pat. Nos. 3,830,880 and 3,140,278.

Self-reinforcing block copolymers are particularly useful in the preparation of products whose vulcanization would be either awkward, undesirable or expensive, such as adhesives, coatings and elastic threads. Coatings and adhesives often require the deposition of polymer from solution. Two desirable properties of the polymer for these applications are solubility in a wide range of suitable solvents and insensitivity of film properties to solvent choice.

A self-reinforcing thermoplastic block copolymer which has relatively high tensile strength and solubility in a wide variety of solvents has many application possibilities. Desired properties such as elasticity and low permanent set or residual strain, tear strength, and resistance to moisture permeation can be built into block copolymers by adjusting such variables as overall molecular weight, molecular weight of the individual blocks, weight ratio of the blocks, and the types of blocks used. Thus, block copolymers can be used in such varied applications as coatings, films, adhesives, rubber bands, shoe soles, rubber hose, automotive parts, impact-resistant plastics, and artificial leather.

Although hydrogenation and hydrochlorination (as mentioned previously) have been utilized in modifying diene block copolymers, the fact that polydienes are known to cyclize has not heretofore been utilized to achieve self-reinforcing block copolymers. A possible explanation is that previous studies have indicated significant disadvantages. For instance, polyisoprene is reported to undergo chain scission when it is exposed to cyclization conditions. In the case of polybutadienes, substantial crosslinking and gel formation accompanies cyclization. Thus, it was quite unexpected that IBI-type block copolymers could be cyclized to essentially soluble products with very little evidence of chain scission or other disadvantages.

Cyclization of homopolymeric elastomers is well known in the art. The production of a resin from natural rubber by cyclizing it with stannic chloride or chlorostannic acid has long been known. Cyclization reactions of natural and synthetic rubbers are reported in J. J. Janssen, *Rubber Age*, 78, 718 (1956); M. Stolka, J. Vodehnal, and I Kossler, *J. Polym. Sci., A*, 2, 3987 (1964); and M. A. Golub and J. Heller, *Can. J. Chem.*, 41, 937 (1963).

The cyclization of diene polymers has been discussed by M. A. Golub, "Cyclized and Isomerized Rubber," Chapter 10 in *Polymer Chemistry of Synthetic Elastomers*, Kennedy and Tornqvist, eds., John Wiley and Sons, 1969.

The experimental work on which this specification is based has shown that under appropriate conditions cationic catalysts and catalyst/cocatalyst combinations are capable of achieving selective cyclization of block copolymers derived from conjugated diene monomers.

SUMMARY OF THE INVENTION

According to the invention there is disclosed a cyclized block copolymer having a molecular weight of from about 10,000 to about 300,000 comprised of at least two different blocks, at least one of which blocks is a cyclizable block derived from a conjugated diene monomer of the general structure

wherein,
$R_1$ is selected from a hydrocarbyl group containing one to twelve carbon atoms, $R_2$ is selected from hydrogen or a hydrocarbyl group containing one to twelve carbon atoms; and at least one of which blocks is a non-cyclizable block derived from at least one member selected from the following classes of compounds:

(a) polymers of conjugated diene monomers of the general structure

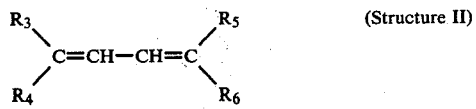

wherein:
$R_3$, $R_4$ and $R_5$ are the same or different and are selected from hydrogen or a hydrocarbyl group containing one to twelve carbon atoms; $R_6$ is selected from hydrogen, a hydrocarbyl group containing one to twelve carbon atoms or a cyano group,
(b) polymers of α-methylstyrene, styrene, alkyl or aryl substituted styrenes or halogen substituted styrenes,
(c) polymethacrylonitrile, polycaprolactam, polycaprolactone or polydimethylsiloxane, said cyclized blocks constituting about 5–95 weight percent of cyclized block copolymer and said non-cyclized blocks constituting about 95–5 weight percent of cyclized block copolymer.

The compositions of this invention are therefore cyclized block copolymers obtained by selective cyclization of block copolymers having at least two different blocks, at least one of which is derived from a Structure I conjugated diene monomer, which blocks exhibit a difference in selectivity to cyclization. These novel compositions possess useful physical and mechanical properties.

The conjugated diene block copolymers may be prepared by several methods well known to the art, two of which are sequential or "stepwise" addition and "coupling". Each of these methods involves the same initial stages. A conjugated diene monomer is subjected to solution polymerization in the presence of an anionic catalyst, and polymerization is conducted to the point where the first polymer block is formed. This type of polymerization usually results in what is called a living polymer. By the term "living" polymer is meant that the polymerization has no termination or transfer reaction so that the polymer chains have catalyst moieties attached to the chain end, even when all the monomer is consumed. If additional monomer is added, the polymerization will continue with the new monomer adding on to already existing living chains until it is consumed. Usually these terminally active polymers are liquids.

In sequential addition, after the first polymerization and without the termination of the growing polymer chain, a second monomer is added to the polymerization reactor. This second monomer is added in such amounts and the reaction allowed to proceed to such an extent as to produce a polymer of the desired composition and molecular weight. This procedure can then be continued with additional different monomers as desired. Block copolymers produced by sequential addition can be (capital letters represent homopolymeric blocks) linear diblocks (AB), triblocks (ABA or ABC), alternating blocks [(AB)n], or sequential polymers having more than three different homopolymeric blocks.

If the coupling process is involved, the types of block copolymers which result are linear, branched, or radial blocks [(AB)$_n$-X]. These types of block copolymers are synthesized by adding a linking agent to the terminally reactive block copolymers such as AB diblocks. The star or radial structure consists of the copolymeric arms connected to the linking agent, the linking agent being in small proportion to the total polymer. Many linking or coupling agents are available, and generally it has been thought that the number of arms formed depends on the number of functional groups carried by the linking agents. Examples of coupling agents are difunctional compounds such as dimethyldichlorosilane, methylene iodide, and 1,2-dibromoethane, di- and trivinyl aromatic compounds such as divinyl benzene, and other tri- and tetra functional compounds such as methyltrichlorosilane, and silicone tetrachloride. Other examples of coupling agents are octachlorosilanes and dodecachlorosilanes.

The compositions of the following U.S. patents are representative of the copolymers formed by the coupling technique: Nos. 3,985,830; 3,949,020; 3,668,279; and 3,281,383.

Another method for preparing conjugated diene block copolymers suitable for subsequent selective cyclization, consists in reacting together individual polymer blocks having appropriate terminal groups. For instance, a polybutadiene block having terminal carboxylic groups at both ends may be reacted via condensation reaction with a polyisoprene block having a hydroxyl group at one end to yield polyisoprene-polybutadiene-polyisoprene block copolymers wherein the individual blocks are linked together by ester groups. Likewise, the above polybutadiene block may be reacted with a polyisoprene block having hydroxyl groups at both ends to yield a block copolymer with alternating blocks of polyisoprene and polybutadiene.

The polybutadiene required for the above reaction may be readily prepared by polymerizing butadiene monomer with a dilithium initiator, followed by termination with carbon dioxide to introduce terminal carboxylic groups. Similarly, polyisoprene with hydroxyl groups at one or both ends may be prepared by polymerizing isoprene monomer with butyl lithium or a dilithium initiator, respectively, followed by termination with ethylene oxide to introduce hydroxyl groups.

In a similar manner, a diblock of polyisoprene and polybutadiene having a hydroxyl group at the polybutadiene end may be linked with polystyrene having an isocyanate group at one end to produce a polyisoprene-polybutadiene-polystyrene block copolymer possessing polyurethane linkages. A modification of this reaction would be to react the above diblock of polyisoprene and polybutadiene with trimellitic acid to yield a branched block copolymer.

In addition to block copolymers comprised of homopolymeric blocks, as described above, other types of block copolymers amenable to the cyclization process of this invention are:

(1) Those as described above except that the blocks need not be purely homopolymeric. For example, in IBI or IB type block polymers, the polybutadiene blocks may be comprised of greater than 50% butadiene with the remainder being styrene. Another possibility is a block comprising isoprene with a minor amount (e.g. 5%) of butadiene.

(2) Block polymers wherein one of the blocks is not a polydiene, it may be polydimethylsiloxane,

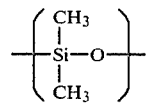

for instance. The resulting compositions containing cyclized diene blocks and silicone rubber blocks should exhibit good thermal stability and aging properties.

Cyclized products derived from A-B type block copolymers, where A is a polydiene block and B is an amorphous or crystalline block (polystyrene, polycaprolactone, polycaprolactam), may be used for enhancing compatibility in certain blend compositions.

By selective cyclization of block copolymers is meant essentially exclusive cyclization of one or more blocks of similar structure. For instance, a polyisoprene-polybutadiene-polyisoprene block copolymer (IBI)

containing predominantly 1,4-structures may be suitably reacted with $SnCl_4$ to bring about the selective cyclization of polyisoprene end blocks. Likewise, a polyisoprene-polypiperylene-polyisoprene block copolymer containing 1,4-structures may be suitably cyclized to cause the selective cyclization of polyisoprene end blocks. Similarly, a polyisoprene-polybutadiene-polystyrene block copolymer containing predominantly 1,4- or 3,4-structures in the isoprene block may be cyclized under suitable conditions to cause the cyclization of only the isoprene block.

The degree of cyclization attained affects the ultimate properties of the cyclized block copolymers. It depends on several factors, including the chemical structure of the block undergoing cyclization, the weight percent of this block, its molecular weight and conditions for the cyclization reaction. It is not essential to achieve complete cyclization of the block undergoing cyclization. For instance, an IBI copolymer of suitable molecular weight having 80 percent isoprene may be lightly cyclized to yield a product exhibiting elastomeric behavior, or more fully cyclized to a resinous product.

The degree of cyclization is difficult to define precisely. It may be estimated by examining several parameters such as the loss of unsaturation, increase in specific gravity and increase in refractive index due to cyclization.

The cyclization of the block copolymers formed by the processes described above may be done in situ, or the block copolymers may be recovered by any standard technique such as hot water coagulation in a stirred vessel or by precipitation with a nonsolvent such as an alcohol or alcohol/acetone mixture, followed by drying. It is preferable to carry out the cyclization directly on the reaction mixture after polymerization, for convenience and to save energy needed to redissolve the isolated polymer. However, under certain circumstances, it may be desirable to isolate and redissolve the polymer in a suitable solvent for carrying out the cyclization reaction.

Solvents which may be used are those which are inert to the cyclization reaction themselves. Aliphatic, cycloaliphatic, aromatic, and chlorinated solvents may be used (e.g. hexane, heptane, cyclohexane, toluene, benzene, chlorobenzene, ethyl chloride, dichloroethane and carbon tetrachloride). For environmental reasons, it is preferred that benzene be avoided (limitations one exposure to benzene vapors imposed by the Occupational Safety and Health Administration). Cyclic aliphatic solvents are preferred. The concentration of block copolymer is generally from one to 30 weight percent, preferably from five to 15 weight percent. Under appropriate conditions, cyclization may be performed in bulk, i.e., without the addition of a solvent.

To the solution of block copolymer is added a cyclization catalyst solution. Typical conditions of the cyclization reaction are as follows: (A) temperature of about 0°-200° C., preferably 25°-100° C.; (B) cyclization catalyst concentration of from about 0.1 to 20 parts, and preferably 1-10 parts by weight per 100 parts by weight of block copolymer; and (C) reaction time ranging from about 0.2 to 25 hours, preferably 1-16 hours with cocatalyst.

The cyclization reaction is stopped by a standard method such as cooling or the addition of a catalyst deactivating agent such as methanol or another suitable alcohol, an alcohol/water mixture, an amine, or any basic solution (see U.S. Pat. No. 3,985,826, column 4, lines 10-17).

The cyclized polymers may be recovered by precipitation into a nonsolvent such as methanol or by hot water coagulation in a stirred vessel. The rubber crumb or resin slurry thus obtained is filtered or screened and the product dried in conventional rubber or resin processing equipment.

The cyclized block copolymers cover a spectrum of materials including rubbers, thermoplastic elastomers and resins. For exhibiting these features, the portion of the cyclized block copolymer which is comprised of cyclized diene block is generally about 5 to 95 weight percent, preferably 10 to 90 weight percent. The exact amount is dependent upon several factors such as chemical nature of monomers constituting block copolymer, the type of block copolymer, microstructure of the polydiene block undergoing cyclization, and the degree of cyclization.

This invention thus embodies a wide variety of compositions. For instance, by selecting the sequence of block polymer formation from monomers selected from isoprene, butadiene and styrene, the block copolymers prior to the cyclization reaction can be IBI, BIB, IBS, BIS, ISB or SIS, where I, B and S represent homopolymers of isoprene, butadiene and styrene, respectively. Where radial or branched block copolymers are required prior to cyclization reaction, they can have the general structure $(IB)_n$-X, $(BI)_n$-X, $(SI)_n$-X, $(IS)_n$-X, $(SIB)_n$-X, $(SBI)_n$-X, $(IBS)_n$-X, $(ISB)_n$-X, $(BIS)_n$-X, or $(BSI)_n$-X, where X is a nucleus derived from a linking or coupling agent.

If a thermoplastic elastomer is desired, the block copolymer should be one in which one or all of the terminal blocks are the ones most selective to cyclization.

Thus, in the case of triblock copolymers for making thermoplastic elastomers, the preferred compositions for cyclization are IBI, IBS, $(IB)_n$-X, $(ISB)_n$-X, $(SIB)_n$-X and $(IBS)_n$-X. In these compositions, the weight percentage of polyisoprene, or polyisoprene plus polystyrene blocks in the block copolymer is usually about 20-40, preferably 25-35.

Conventional rubber additives (carbon black, silica, dyestuffs, pigments, antioxidants, blending oils, and extender oils) known in the rubber compounding art, can be incorporated into the cyclized block copolymers of this invention.

The cyclized block copolymers of this invention can be utilized (depending upon the particular composition chosen) in such varied applications as adhesives, molded articles, lubricating oil viscosity index improvers, coating compositions, films (solvent cast or extruded), shoe soles and tires.

DESCRIPTION OF THE PREFERRED EMBODIMENTS

The polymerization to form block copolymers is conducted under conditions which would avoid inadvertent termination of the growing polymer chains. Anaerobic conditions are essential, and reactive impurities, such as compounds containing active hydrogen atoms (acetylenes, cyclopentadienes, water, alcohol, acids and the like) and other polar compounds must be removed from both the monomer and solvents.

The temperature range for the polymerization is usually between 0° and 200° C., the preferred range being between about 25° and 100° C. Pressures during the reaction may range from sub-atmospheric to 100 atmospheres, a preferred range being from atmospheric to 5 atmospheres; and reactions may be carried out in a closed pressure vessel under the autogenous pressure of the monomer and/or the solvent.

Examples of conjugated diene monomers of structure I which yield cyclizable blocks are isoprene, 2,3-dimethyl-1,3-butadiene, 2,3-diethyl-1,3-butadiene, 2,3-di-n-propyl-1,3-butadiene, 2-methyl-3-isopropyl-1,3-butadiene, 2-methyl-3-ethyl-1,3-butadiene, 2-phenyl-1,3-butadiene, 3-methyl-1,3-pentadiene, 2-ethyl-1,3-butadiene, 2-methyl-1,3-hexadiene, 3-methyl-1,3-heptadiene, 3-butyl-1,3-octadiene and 3-n-propyl-1,3-pentadiene, whereas examples of conjugated dienes of structure II which produce non-cyclizable blocks are 1,3-butadiene, 1,3-pentadiene, 2,4-hexadiene, 1,3-hexadiene, 1,3-heptadiene, 1,3-octadiene, 4,5-diethyl-1,3-octadiene, and 1-cyano-1,3butadiene.

The preferred monomers for structure (I) are isoprene, 2-ethyl-1,3-butadiene and 2-phenyl-1,3-butadiene.

The preferred monomers for structure (II) are butadiene, piperylene and 2,4-hexadiene.

Other non-cyclizable blocks are polymers of α-methylstyrene, styrene, alkyl or aryl substituted styrenes or halogen substituted styrenes and polymethacrylonitrile-polycaprolactone or polydimethylsiloxane.

The concentration of monomer before the polymerization commences, generally varies from 0.5 to 90 weight percent in an inert diluent, or no diluent need be used at all.

The catalysts utilized in the polymerization are organoalkali metal initiators. Branched and straight chain aliphatic, cycloaliphatic, aromatic, alkaryl and aralkyl alkali metal initiators may be used. By far the best results are obtained with organolithium compounds, which also give high 1,4-structural repeat units from dienes. There may be more than one alkali metal substituent for each catalyst molecule (e.g. dilithium catalysts). Dilithium catalysts have been reviewed by Forman, L. E., Chapter 6 of *Polymer Chemistry of Synthetic Elastomers*, Kennedy and Tornqvist, eds., Interscience, (1969).

Typical examples of catalysts for the formation of the block copolymers are found in U.S. Pat. No. 3,449,306, column 2, lines 62–65 and column 3, lines 1–28; U.S. Pat. No. 3,890,408, column 4, lines 42–52; and U.S. Pat. No. 3,891,721, column 1, lines 64–65, all of which are hereby incorporated by reference into this application.

The amount of organoalkali metal catalyst to be used in the practice of this invention cannot be specified since the amount of catalyst depends on the desired molecular weight of the polymer. As a general rule, the molecular weight of the polymer is equal to the grams of monomer used divided by the gram moles of organolithium catalyst employed whenever organolithium catalyst is used. Thus, one skilled in the art can adjust the monomer and/or catalyst level to obtain the desired molecular weight polymer.

Inert diluents or solvents utilized in the polymerization are nonacidic aliphatic, cycloaliphatic or aromatic hydrocarbons which are inert under reaction contitions. Suitable polar and nonpolar solvents may be used. Some examples of suitable solvents are: hydrocarbons having 2–12 carbon atoms such as pentane, hexane, heptane, octane, and isooctane; cyclic hydrocarbons such as cyclohexane, dimethylcyclohexane, and cyclopentane; aromatics such as benzene, toluene, and xylene; and polar solvents such as tetrahydrofuran.

The order of monomer addition is important in that it determines the relative positions of the homopolymer blocks within the block copolymer. Thus, the last monomer added in a sequential addition polymerization forms the homopolymer block on one or more ends of the block copolymer, depending on the functionality of the organolithium catalyst.

The solvent for the cyclization catalyst solution is generally the same as the solvent in which the block copolymer is dissolved. Polar solvents such as methylene chloride, ethylidene chloride, nitromethane and nitrobenzene and mixtures thereof may also be used.

In general, compounds which are cationic polymerization initiators are suitable catalysts for achieving selective cyclization. Catalysts belonging to the class of Lewis acids are preferred in the practice of this invention.

Examples of which are $SnCl_4$, $SnBr_4$, $TiCl_4$, $TiBr_4$, $BF_3$ and $BCl_3$. Boron trifluoride may be conveniently used in complexes with suitable compounds such as diethylether, tetrahydrofuran or phenol.

It is well known in the art that Lewis acids alone generally are not active initiators of cationic reactions. A wide variety of compounds are needed to activate these catalysts. See for instance "The Chemistry of Cationic Polymerization", P. H. Plesch, Editor, Pergamon Press (1963); "Organic Chemistry of Synthetic High Polymers", R. W. Lenz, Editor, John Wiley & Sons (1967); 4th International Symposium on Cationic Polymerization, J. P. Kennedy, Editor, John Wiley & Sons (1976). Examples of cocatalysts are water, protonic acids and alkyl halides.

A cocatalyst may be used in conjunction with the Lewis acid, not only to modify the rate but also to modify characteristics of the cyclization reaction. No cocatalyst is required for $BF_3 \cdot Et_2O$. However, trichloroacetic acid is an excellent cocatalyst in conjunction with $SnCl_4$ and $TiCl_4$. Similarly, trifluoroacetic acid is an efficient cocatalyst with $TiCl_4$. A variety of other cocatalysts known to the art are also considered to be effective in combination with Lewis acids in the practice of this invention. The ratio of cocatalyst to catalyst depends upon the components of the cyclization system being considered.

Experimentation with $SnCl_4$ catalyst and IBI block copolymer has revealed that some gelation and probably some chain scission accompanies cyclization, but these side reactions can be minimized by using judicious cyclization conditions, for example, low catalyst levels (4 parts by weight of catalyst per 100 parts by weight of copolymer) and low cocatalyst to catalyst ratios (less than or equal to 0.8 moles cocatalyst per mole of catalyst). Under these conditions low gel (1–6%) products were obtained. Gel is the percentage of a 0.25 gram sample of polymer which would not dissolve in 50 milliliters of toluene in 24 hours at room temperature.

The approximate number average ($\overline{M}n$) molecular weights of the cyclized IBI triblocks (determined by gel permeation chromatography using polystyrene standards) ranged from about 87,500 to 120,000 compared to the values of 161,000 and 165,000 for the precursor IBI, suggesting that some chain scission may have accomplished cyclization of the block copolymers. The molecular weight range for the cyclized block copolymers of this invention is generally from 10,000 to 300,000, preferably 50,000 to 150,000. Cyclization of polyisoprene is reported to cause side reactions which include chain scission (see Angelo, R. J., "A Linear Fused Cyclohexane Polymer: Cyclized Poly-3,4-Isoprene", *Polymer Reprints*, 4, #1, pp. 32-33 (1963); Falcon, R. K. and Fredericks, E. C., "Cyclization of cis-1,4-Polyisoprene", *J. Polymer Science*, A-1, 10, p. 1839 (1972); and Zachoval and Veruovic, "The Fragmentation Reaction in Polyisoprene Cyclization" *Org. Chem. and Technology*, C20, p. 33 (1973); Chem. Abstr. 81: 106956d (1974).

Although it is not absolutely necessary, it is desirable to add a stabilizer to the reaction mixture when the cyclization is stopped, to prevent gel formation and loss of desirable properties such as thermoplasticity. Any antioxidant suitable for block copolymers (phenolic, amine, sulfur-containing) may be used, depending on the end use.

It is instructive to look at the structures of SBS and cyclized IBI. The SBS has terminal blocks of polystyrene:

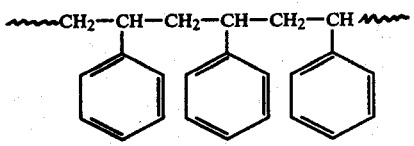

i.e. phenyl groups on the alternating carbon atoms of a polymethylene chain.

In contrast, the cyclized IBI has totally different structures in the cyclized terminal blocks of polyisoprene. These structures are believed to be an integral part of the main chain and are not present as pendant groups. For instance, mono-, di-, tri- and high cyclic structures are believed to be present when 1,4-polyisoprene is cyclized.

( ∼∼∼ denotes polymer chain)

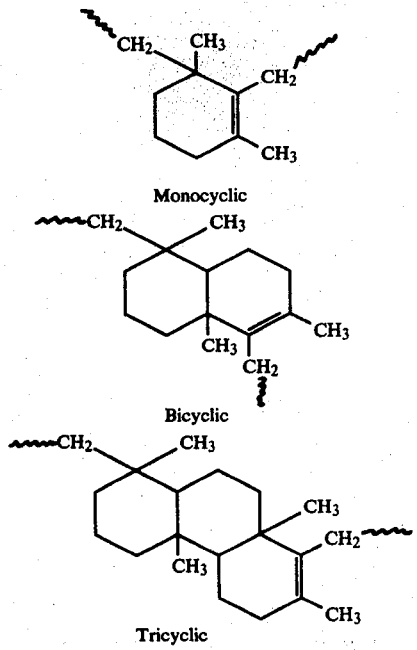

In addition to these cyclic structures, there exist a few randomly isolated isoprene units as integral part of the main chain. These units are isolated or "widows" due to the random process of cyclization of polyisoprene.

The cyclized compositions differ substantially from the corresponding hydrochlorinated analogs. There are present polar groups as essential, chemically bound moieties in the hydrochlorinated product. Only a small quantity of a Lewis acid catalyst is required to selectively cyclize certain polydiene segments as compared to the large amount of HCl required for hydrochlorination.

The microstructure of the block copolymer is important, because it affects the way in which cyclization takes place (see Golub referred to near the end of the Background section). When isoprene is used, it is preferred that at least 80 percent of the polyisoprene block or blocks contain 1,4-structure. NMR analysis (spectrometer frequency at 300 MHz) of a suitable IBI triblock copolymer gave the following structural distribution on a molar basis: 3,4-polyisoprene 4%, 1,4-polyisoprene 56%, 1,2-polybutadiene 2%, and 1,4-polybutadiene 38%.

Polar modifiers (e.g. diglyme and tetrahydrofuran) can be used to affect polymer microstructure. When diglyme (dimethyl ether of diethylene glycol) is mixed with the isoprene monomer in an IBI triblock polymerization catalyzed by a dilithium initiator, the polyisoprene blocks have predominantly the 3,4-microstructure. In star or radial $[(IB)_n-X]$ type block copolymers, diglyme mixed with the butadiene monomer results in polybutadiene blocks having more than the normal percentage of the vinyl or 1,2-microstructure (as opposed to 1,4-) which imparts greater elasticity to polymers hydrogenated subsequent to cyclization. In the formula above which defines star or radial type block copolymers, X is a nucleus derived from a linking or coupling agent. Examples of linking or coupling agents are divinylbenzene, trivinylbenzene, dimethyldichlorosilane, methyl trichlorosilane, silicon tetrachloride, octachlorosilanes, dodecachlorosilanes, dibromoethane, methylene iodide and the like. Of course, IB is intended to designate a polyisoprene-polybutadiene diblock polymer; n is simply the number of polymeric arms of radial or star block polymer and depends upon the multiple functionality of the linking or coupling agent employed.

The following examples illustrate the present invention. In the examples and tables which follow, the following definitions of terms will apply:

mhm is millimoles of a compound per hundred parts by weight monomer;

phr is parts by weight of a compound per 100 parts by weight of polymer;

percents are by weight unless otherwise stated;

inherent viscosity is measured according to ASTM standard D2857 using toluene solvent;

$\overline{M}_n$ means number-average molecular weight; and

2-BuLi means secondary butyl lithium.

EXAMPLE I

In this example, block copolymers of general structure polyisoprene-polybutadiene-polyisoprene (IBI) were prepared by the "step-wise" addition method, and subsequently treated with $SnCl_4/CCl_3COOH$ at 80° C. to catalyze selective cyclization of the polyisoprene terminal blocks. Four different copolymers were prepared and cyclized, the copolymers having different weight percentages of isoprene and/or being cyclized for different periods of time.

The IBI copolymers were prepared by first polymerizing in a 32-ounce bottle a quantity of butadiene in heptane at ambient temperature until the monomer had polymerized to completion (about 16 hours).

The polymerization initiator was a solution of alpha-lithio substituted dialkylbenzenes and dialkylbenzene oligomers in hexane-triethylamine solution represented by the following general formula:

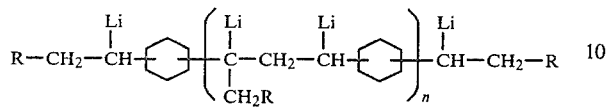

wherein R is sec-butyl, N=0 (approximately 90%), n=1 (approximately 10%) and n=2 (trace), its average molecular weight being 278. It was sold under the Trademark DiLi-3 by the Lithium Corporation of America as a 17% solution in hexane and triethylamine, the latter comprising about 13% of the solution. DiLi-3 used in this work was diluted to a 0.2 molar solution in heptane.

A quantity of isoprene was then added to the polymer solution and allowed to polymerize to near completion at ambient temperature. The polymer solution had a solids content of about 10%. The polymerizations were terminated with a few milliliters of methanol. The polymers were recovered by precipitation into a large excess of acetone/methanol (50/50) solution, and dried at 40° C. for 24 hours in a vacuum oven. Data on the preparation and characterization of these polymers are given in Table 1.

TABLE 1

Preparation and Characterization of Isoprene-Butadiene-Isoprene Block Copolymers conditions: Heptane solution (10 weight % monomer charge), about 1 mmole DiLi-3 per 100 g. monomer, polymerization at 25° C. for 24 hours to form polybutadiene block and 48 hours for polyisoprene end blocks.

| Diene Triblock Number | Approximate Composition[a] (wt. %) | Polymer Isoprene Content[b] (wt. %) | $\overline{M}n \times 10^{-3}$ |
|---|---|---|---|
| IBI-1 | 15I-70B-15I | 20 | 56 |
| IBI-2 | 20I-60B-20I | 30 | 94 |
| IBI-3 | 25I-50B-25I | 40 | 80 |

TABLE 1-continued

Preparation and Characterization of Isoprene-Butadiene-Isoprene Block Copolymers conditions: Heptane solution (10 weight % monomer charge), about 1 mmole DiLi-3 per 100 g. monomer, polymerization at 25° C. for 24 hours to form polybutadiene block and 48 hours for polyisoprene end blocks.

| Diene Triblock Number | Approximate Composition[a] (wt. %) | Polymer Isoprene Content[b] (wt. %) | $\overline{M}n \times 10^{-3}$ |
|---|---|---|---|
| IBI-4 | 30I-40B-30I | 50 | 72 |

[a]Monomer charge ratio.
[b]By infrared spectroscopy.

In order to prepare cyclized polymers, benzene solutions (6%) of the IBI triblocks (osmotic $\overline{M}n$ values given in Table 1) were prepared in bottles and each solution thoroughly purged with high purity, dry nitrogen. The required quantities of SnCl$_4$ solution in benzene and CCl$_3$COOH solution in benzene were added and the bottles capped and rotated in an 80° C. bath for the required period of time. Cyclizations were stopped by cooling the polymer solutions to ambient temperature and adding a stabilizer solution of di-tert.-butyl-p-cresol in methanol. The cyclized polymers were recovered by precipitation into excess methanol and drying at 40° C. in a vacuum oven. Cyclization conditions and characterization results are given in Table 2.

Benzene solutions (6%) of the cyclized copolymers were filtered through fine nylon mesh cloth to remove gel, if any, and films cast on a taut cellophane sheet. After slow evaporation of the benzene (48 hours), the films were dried in a vacuum oven for 48 hours at ambient temperature. Tensile strength, modulus, and elongation were measured on samples cut from films prepared in this manner, unless otherwise stated. Tensile strength and modulus were measured according to ASTM D412 Method A at 25° C. with dumbbell specimens (0.25 mm. thick and 2.54 mm. wide) at a grip separation speed of 12.7 cm./min. (5 in./min.). Elongation is the extension between marks on the specimen produced by an applied force and expressed as a percentage of the original distance between the marks.

TABLE 2

Cyclization of Isoprene-Butadiene-Isoprene Block Copolymers

Conditions: Benzene solution of copolymer (6 wt. %); 80° C., SnCl$_4$ = 4 phr, CCl$_3$COOH/SnCl$_4$ molar ratio = 0.4

| Cyclized Triblock Number | Cyclization Time (Hrs.) | Inherent Viscosity (dl/g) | Gel (%) | Tensile Strength (psi/MPa**) | Elongation @ Break (%) | 100% Modulus (psi/MPa**) |
|---|---|---|---|---|---|---|
| From IBI-1 (20% Isoprene) | | | | | | |
| 1 | 3 | 1.1 | 0.5 | 560/3.86 | 1060 | 145/.999 |
| 2 | 5 | 1.1 | 0.5 | 635/4.375 | 980 | 155/1.07 |
| From IBI-2 (30% Isoprene) | | | | | | |
| 3 | 3 | 2.3 | 2 | 1465/10.09 | 770 | 310/2.14 |
| 4 | 5 | 2.4 | 1 | 2455/16.92 | 600 | 465/3.20 |
| From IBI-3 (40% Isoprene) | | | | | | |
| 5 | 3 | 0.9 | 0 | 925/6.37 | 320 | 840/5.7 |
| 6* | 5 | — | — | 1430/9.85 | 310 | 1050/7.235 |
| From IBI-4 (50% Isoprene) | | | | | | |
| 7* | 3 | 0.8 | 2 | 2660/18.33 | 400 | 1625/11.20 |
| 8 | 4 | 0.7 | 0 | 3050/21.02 | 365 | 1850/12.75 |

*CCl$_3$COOH/SnCl$_4$ Molar Ratio = 0.8 in these experiments.
**Megapascals.

Significantly, the IBI block copolymers prior to cyclization were viscous semi-solids. After selective cyclization of the terminal polyisoprene blocks, the triblock copolymers exhibited the high strength properties typical of reinforced vulcanized elastomers, but remained fully soluble in solvents such as benzene. The infrared spectra and proton NMR (300 MHz) spectra showed that only the polyisoprene was effected by the cyclization reaction. The amount of polybutadiene cyclized, if any, was negligible according to these spectroscopic measurements.

Cyclized isoprene-butadiene-isoprene block copolymers, like the SBS copolymers, show a strong dependence of stress-strain behavior on copolymer composition. In general, modulus and tensile strength increased as the isoprene content was increased from 20 to 50%. The elongation at break decreased from 1000% to about 300-400%. Similarly, they exhibit elastomeric behavior when the end-block content of the copolymer is about 20-40 weight percent.

The best elastomeric properties were obtained when the IBI contained about 30% isoprene. At 20% isoprene content, the products were weak elastomers, while at 40-50% isoprene levels they were somewhat leathery.

EXAMPLE II

In this example, five polyisoprene-polybutadiene-polyisoprene block polymers were prepared in a 27-gallon reactor using various lithium initiators and either a two-step or three-step monomer addition sequence as outlined in Table 3.

One of the lithium initiators was a mixture of dilithium-isoprene oligomers in benzene-triethylamine solution and is represented by the following general formula:

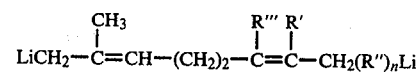

wherein
$R''' = H$ or $CH_3$;
$R' = CH_3$ or H;
$R'' = 1,4$ and $3,4$ isoprene adducts;
$n' = 4$ (average); and
average molecular weight = 432.

It was sold under the trademark DiLi-1 by the Lithium Corporation of America as a 27% solution in benzene and triethylamine (4 molar equivalents of triethylamine per carbon-lithium bond).

Polymerizations employing dilithium initiators were highly exothermic, with temperature maxima of 79 and 91° C. (Table 3), whereas the three 2-BuLi initiated polymerizations exhibited maximum temperatures of ≈66° C. at similar molar initiator levels. Cyclizations were carried out in various solvents (Table 4) and at various triblock and catalyst concentrations (Table 5).

TABLE 3

Synthesis and Characterization of IBI Block Copolymers

| IBI Batch[a] | Catalyst Type | Catalyst mhm | Technique[b] | Polymerization Temp. (°C.) | Cement Solids[c] (Wt. %) | Polymer Inherent Viscosity[c] (dl/g) | Polymer Isoprene Content (Wt. %)[e] |
|---|---|---|---|---|---|---|---|
| A | DiLi-3 | 1.0 | 2-step | 46-88 | 15.1 | 2.1 | 35 |
| B | 2-BuLi | 0.57 | 3-step | 38-62 | 11.6 | 1.5 | 45 |
| C | DiLi-1 | 0.925 | 2-step | 36-79 | 13.9 | 0.90 | 35 |
| D | 2-BuLi | 1.06 | 3-step | 24-67 | 13.4 | 1.0 | 35 |
| E | 2-BuLi | 0.92 | 3-step | 38-66 | 11.4 | 1.0 | 44 |
| F | 2-BuLi | 0.93 | 3-step | 35-60 | 11.1 | 0.90 | 65[f] |
| G | 2-BuLi | 1.7 | 3-step | 35-61 | 10.7 | 0.75 | 81[f] |

[a]All copolymers prepared by sequential monomer addition. Batch A prepared in hexane; all other copolymers prepared in cyclohexane.
[b]Order of monomer addition; (1) butadiene (2) isoprene in 2-step; (1) isoprene (2) butadiene (3) isoprene in 3-step; reaction times 1-4 hours per step.
[c]Pan solids by evaporation of aliquot samples; all conversions were approximately 100%.
[d]Toluene at 30° C.
[e]Infrared analysis.
[f]By 300 MHz Proton NMR.

TABLE 4

Cyclization of IBI Batch A[a] in Various Solvents

Conditions: 6 Wt. % solution of IBI, CCl$_3$COOH/SnCl$_4$ molar ratio = 0.8, 80° C., 3 hrs.
All films cast from benzene for evaluation of stress-strain and tear strength.

| Solvent | SnCl$_4$ (phr) | Inherent Viscosity (dl/g) | Gel (%) | Tensile Strength (psi/MPa) | Elongation @ Break (%) | 100% Modulus (psi)/MPa | Crescent Tear[b] (lbs/in) |
|---|---|---|---|---|---|---|---|
| Benzene | 8 | 1.7 | <1 | 3000/20.67 | 435 | 670/4.62 | 208 |
| Benzene | 4 | 1.6 | <1 | 2985/20.57 | 430 | 685/4.72 | 245 |
| Cyclohexane | 8 | 1.7 | 6 | 2650/18.26 | 700 | 615/4.24 | 230 |
| Cyclohexane | 4 | 1.8 | 31 | — | — | — | — |
| Heptane | 8 | — | 1 | 2860/19.71 | 700 | 650/4.48 | 250 |
| Heptane | 4 | 2.2 | 15 | — | — | — | — |

[a]See Table 3 for synthesis and characterization details.
[b]ASTM D-624

TABLE 5
Cyclization of IBI Block Copolymers
Conditions: Cyclohexane solution, $CCl_3COOH$/catalyst molar ratio = 0.8, 80° C., 3 hrs.

| IBI Batch No.[a] | IBI Conc. (Wt. %) | Catalyst Type | Catalyst (phr) | Inherent Viscosity (dl/g) | Gel, % | Tensile Strength (psi)/MPa | Elongation @ Break (%) | 100% Modulus (psi)/MPa | Crescent Tear (lbs/in) |
|---|---|---|---|---|---|---|---|---|---|
| B | 6 | $SnCl_4$ | 10 | 1.1 | 2 | 5000/34.45 | 650 | 980/6.75 | 460 |
| B | 12 | " | 10 | — | High Gel | — | — | — | — |
| B | 12 | " | 5 | — | " | — | — | — | — |
| C | 7 | " | 9 | 1.0 | 1 | 1250/8.613 | 1325 | 330/2.27 | 220 |
| C | 14 | " | 4.5 | 1.1 | 1 | 1150/7.924 | 1125 | 215/1.48 | — |
| D | 13 | " | 9 | 1.2 | 16 | 2550/17.57 | 580 | 385/2.65 | 210 |
| D | 13 | " | 4.5 | 1.0 | 1 | 2900/19.98 | 700 | 330/2.27 | — |
| E | 11 | " | 12 | 1.2 | 17 | 3300/22.7 | 680 | 770/5.30 | 360 |
| E | 11 | " | 6 | 1.0 | 3 | 1160/7.992 | 940 | 260/1.79 | 154 |
| F | 11 | $TiCl_4$ | 2 | — | — | 1725/11.9 | ~5 | — | — |
| G | 11 | " | 4 | — | — | b | b | b | — |

[a]Refer to Table 3 for IBI synthesis and characterization.
Brittle film.

Cyclized thermoplastic elastomers exhibiting good tensile and tear properties were obtained when the IBI triblocks were prepared from either DiLi-3 or sec-butyl lithium initiator. The strength properties of cyclized polymers B-E, without chemical cross-linking, are comparable to filled vulcanizates. The highest tensile and tear strengths were obtained with 2-BuLi initiated IBI and the poorest with DiLi-1 initiated polymer. Polymers F and G, containing over 50% cyclized polyisoprene blocks, gave films suitable for coatings.

Melt viscosity of another cyclized IBI copolymer similar to batch B was measured on a capillary rheometer in the temperature range of 121°-177° C. and compared with the corresponding data on a commercially available SBS block copolymer (30-35% styrene) sold under the trademark of Kraton 1101 by Shell Oil Company. The cyclized IBI showed significantly lower viscosity throughout the temperature range of 121°-163° C. These data were not corrected for capillary entrance effects. These data suggest that lower energy consumption is needed for processing cyclized IBI copolymer.

Infrared data on the cyclized IBI used for the viscosity measurement above showed that there was present only 66% of the original unsaturation based on the uncyclized material, and it was accounted for almost entirely by unsaturation in the polybutadiene block.

EXAMPLE III

In this example, IBI copolymer Batch D (Table 3) was cyclized by the techniques previously described, using either $TiCl_4$ or $BF_3.Et_2O$ as catalyst. The results are given in Table 6. The effective molar ratio of $CCl_3COOH/TiCl_4$ was 0.4/1, which is significantly lower than the ratio of 0.8/1 required in the $CCl_3COOH/SnCl_4$ system in cyclohexane solvent.

TABLE 6
Cyclization of IBI Batch D
Conditions: Cyclohexane solution, 13 wt. % IBI, 80° C., 3 hrs.

| Catalyst Type | Catalyst phr | $CCl_3COOH$, phr | Tensile Strength (psi)/MPa | Elongation @ Break (%) | 100% Modulus (psi)/MPa |
|---|---|---|---|---|---|
| $TiCl_4$ | 4 | 1.4 | 3800/26.18 | 755 | 350/2.4 |
| $BF_3.E_2$ | 4 | 0 | 3000/20.67 | 730 | 300/2.07 |

$TiCl_4$ and $BF_3.Et_2O$ were found to be superior to $SnCl_4$ catalyst. They were effective at lower levels and lower cocatalyst ratios. $BF_3.Et_2O$ required no cocatalyst.

EXAMPLE IV

In this example, IBI copolymer Batch B (Table 3) was cyclized by the techniques previously described using $SnCl_4$ (10 phr) as catalyst. Hot tensile properties of this copolymer and those of Kraton 1101 are compared in Table 7. Cyclized IBI showed good tensile strength retention up to 71° C. whereas Kraton 1101 lost most of its strength by 60° C.

TABLE 7
Hot Tensile Properties of Cyclized IBI and Kraton 1101

| Polymer[a] | MPa Tensile Strength/ % Elongation @ Break (MPa Modulus 100%) | | | |
|---|---|---|---|---|
| | 25° C. | 49° C. | 60° C. | 71° C. |
| Kraton 1101 | 24.12/ 610(1.93) | 7.27/ 640(1.96) | 4.69/510(1.52) | — |
| Cyclized IBI | 20.67/ 480(4.58) | 13.99/ 580(3.76) | 9.20/535(2.69) | 7.23/620(2.41) |

[a]Samples used for tensile testing were compression-molded at 300° F. for 15 minutes and cooled under pressure.

EXAMPLE V

An IBI block copolymer from Batch D, Table 3 was cyclized in cyclohexane at 80° C. for three hours using $TiCl_4$ (6 phr) and a $CCl_3COOH/TiCl_4$ molar ratio of 0.8. Tensile and tear strength properties of cyclized IBI films cast from five different solvents are compared in Table 8. All of the films exhibited similar tensile strengths, modulus values and crescent tear strengths. These data indicate that there is little dependence of film properties on the casting solvents studied. In contrast, films of SBS triblocks are reported to show a marked dependence of properties on casting solvents in the following references: M. Morton, L. J. Fetters, F. C. Schwab, C. R. Strauss, and R. F. Kammereck, Fourth International Syn. Rubber Symp., (London) 3, 70 (1969); J. F. Beecher, L. Marker, R. D. Bradford, and S. L. Aggarwal, J. Polymer Sci. C26, 171 (1969); G. S. Fielding-Russell, Rubber Chem. Technol., 45, 252 (1972).

TABLE 8
STRENGTH PROPERTIES OF CYCLIZED IBI FILMS CAST FROM VARIOUS SOLVENTS

| Solvent | Tensile Strength (psi)/MPa | Elongation @ Break (%) | Modulus MPa 100% | Modulus MPa 300% | Crescent Tear* (lbs/in) |
|---|---|---|---|---|---|
| Hexane | 2540/17.50 | 900 | 1.72 | 2.38 | 164 |
| Cyclohexane | 2950/20.33 | 900 | 1.86 | 2.45 | — |
| Carbon Tetrachloride | 2865/19.74 | 900 | 1.86 | 2.55 | 168 |
| Toluene | 2780/19.15 | 890 | 1.90 | 2.62 | 172 |
| Tetrahydrofuran | 2630/18.12 | 890 | 1.83 | 2.58 | 169 |

*ASTM D624

EXAMPLE VI

In a procedure similar to that followed in Example I, a block copolymer of the general structure poly(2,3-dimethylbutadiene)-polybutadiene-poly(2,3-dimethylbutadiene) was prepared by initiating a heptane solution of butadiene/2,3-dimethylbutadiene at 25° C. using DiLi-3 as catalyst. After 24 hours, the polymerization temperature was increased to 60° C. for an additional 24 hours to provide essentially quantitative conversion of the monomers. The polymerization recipe is given in Table 9, along with cyclization conditions. This cyclized triblock polymer gave a clear film when cast from cyclohexane solution. Proton NMR spectroscopy indicated selective cyclization of the poly(2,3-dimethyl butadiene) segments only.

TABLE 9
DMB[a]—B—DMB COPOLYMER

Synthesis

| | |
|---|---|
| 1,3-butadiene, parts by weight | 50 |
| 2,3-dimethyl-1,3-butadiene, parts by weight | 50 |
| Heptane, parts by weight | 900 |
| DiLi-3, mhm | 1.0 |
| Block Polymer: Inherent Viscosity, dl/g | 0.96 |
| Polybutadiene Content, weight percent | 54 |

Cyclization

| | |
|---|---|
| DMB—B—DMB copolymer[b], parts by weight | 10 |
| Cyclohexane, parts by weight | 90 |
| TiCl$_4$, phr | 4 |
| CCl$_3$COOH/TiCl$_4$, molar ratio | 0.4 |
| Temperature, °C. | 80 |
| Time, hours | 3 |

[a]2,3-dimethyl-1,3-butadiene.
[b]Proton NMR microstructure data; 1,2-polybutadiene 5 mole %; 1,4-polybutadiene 60%; 1,2-dimethylbutadiene 2%; 1,4-dimethylbutadiene 34%.

EXAMPLE VII

A block copolymer of the general structure 3,4-polyisoprene-polybutadiene-3,4-polyisoprene was prepared by the "step-wise" method described in Example I using DiLi-3 as catalyst and diglyme to modify the polyisoprene microstructure. After polymerization of the butadiene for 24 hours at 25° C., a diglyme/isoprene mixture was added and polymerization continued for another 24 hours. The polymerization recipe is given in Table 10 along with the cyclization conditions. Again, proton NMR spectroscopy indicated that only the polyisoprene segment was cyclized. A clear film was obtained when cast from cyclohexane solution.

TABLE 10
3,4-Polyisoprene-Polybutadiene-3,4-Polyisoprene Copolymer

Synthesis

| | |
|---|---|
| 1,3-butadiene, parts by weight | 60 |
| Isoprene, parts by weight | 40 |
| Heptane, parts by weight | 900 |
| DiLi-3, mhm | 2.0 |
| Diglyme*/C-Li molar ratio | 0.5/1 |
| Block Copolymer: Inherent Viscosity, dl/g | 0.8 |
| Polybutadiene Content, weight percent | 63 |
| 3,4-Polyisoprene Content, weight percent | 28 |

*Dimethyl ether of diethylene glycol

Cyclization:

| | |
|---|---|
| Block copolymer[a], parts by weight | 6 |
| Benzene, parts by weight | 94 |
| SnCl$_4$, phr | 4 |
| CCl$_3$COOH/SnCl$_4$ molar ratio | 0.4 |
| Temperature, °C. | 80 |
| Time, hours | 3 |
| Product: Tensile Strength, MPa | 4.84 |
| Elongation at break, % | 635 |

[a]Proton NMR data: 1,2-polyisoprene 4 mole %; 3,4-polyisoprene 25%; 1,4-polyisoprene 3%; 1,2-polybutadiene 19%; 1,4-polybutadiene 48%.

EXAMPLE VIII

A block copolymer of the general structure polyisoprene-polybutadiene-polystyrene was prepared using the "step-wise" method described in Example I, but using 2-BuLi as catalyst. The order of polymerization was: first polymerize isoprene, with subsequent addition and polymerization of a butadiene/styrene mixture. The polymerization recipe is given in Table 11, along with cyclization conditions. Due to higher reactivity of butadiene it is polymerized with virtual exclusion of styrene. Proton NMR analysis of this cyclized triblock indicated selective cyclization of the polyisoprene segment. Therefore, the final product is a triblock polymer having the structure cyclized polyisoprene-polybutadiene-polystyrene. A film cast from the cyclized polymer in cyclohexane solvent was clear.

TABLE 11
Polyisoprene-Polybutadiene-Polystyrene Copolymer

Synthesis:

| | |
|---|---|
| 1,3-butadiene, parts by weight | 60 |
| Isoprene, parts by weight | 20 |
| Styrene, parts by weight | 20 |
| Cyclohexane, parts by weight | 900 |
| 2-BuLi, mhm | 1.5 |
| Block copolymer: Inherent Viscosity, dl/g | 0.6 |
| Polystyrene content, weight percent | 21 |
| Polybutadiene content, weight percent | 56 |

Cyclization:

| | |
|---|---|
| Block copolymer, parts by weight | 10 |
| Cyclohexane, parts by weight | 90 |
| TiCl$_4$, phr | 4 |
| CCl$_3$COOH/TiCl$_4$, molar ratio | 0.4 |
| Temperature, °C. | 80 |
| Time, hours | 3 |

EXAMPLE IX

A diblock copolymer of the general structure polyisoprene-polybutadiene was prepared using the "step-wise" method described in Example I. Isoprene was polymerized for 24 hours at 25° C. using 2-BuLi as catalyst, followed by polymerization of butadiene for a similar time period. The polymerization recipe is given in Table 12, along with cyclization conditions. A clear film of the cyclized polymer was obtained when cast from cyclohexane solution. This film exhibited low strength properties.

EXAMPLE X

A radial block copolymer was prepared by end linking a "living" polyisoprene-polybutadiene-Li diblock with divinylbenzene (DVB). The diblock was prepared as in Example IX, with subsequent addition and polymerization of DVB for 3.5 hours at 25° C. and finally one hour at 60° C. The polymerization recipe along with cyclization conditions are given in Table 12. Analysis of the DVB-treated diblock by gel permeation chromatography in tetrahydrofuran solvent indicated that about 70% of the product was linked, i.e. it was a radial or star polymer. A clear film of the cyclized product cast from cyclohexane solvent exhibited a tensile strength of 26.3 MPa at 525% elongation at break.

TABLE 12
IB Diblock and (IB)$_n$—DVB Radial Copolymers

|  | IB Diblock | (IB)$_n$—DVB Radial |
|---|---|---|
| Synthesis: |  |  |
| 1,3-butadiene, parts by weight | 60 | 60 |
| Isoprene, parts by weight | 40 | 40 |
| Heptane, parts by weight | 900 | 900 |
| 2-BuLi, mhm | 2 | 1.5 |
| DVB$^{(a)}$/2-BuLi molar ratio | — | 5 |
| Block copolymer: Inherent Viscosity, dl/g | 0.7 | 0.9 |
| Polybutadiene content, weight % | — | 49 |
| Cyclization: |  |  |
| Copolymer, parts by weight | 6 | 10 |
| Cyclohexane, parts by weight | 94 | 90 |
| Catalyst (phr) | SnCl$_4$ (4) | TiCl$_4$ (4) |
| CCl$_3$COOH/ catalyst, molar ratio | 0.4 | 0.4 |
| Temperature, °C. | 80 | 80 |
| Time, hours | 3 | 3 |
| Tensile strength, MPa | — | 26.3 |
| Elongation at break, % | — | 525 |

$^{(a)}$Divinylbenzene, (55% total DVB), meta/para isomer ratio of about 2:1.

EXAMPLE XI

If a triblock copolymer were prepared with DiLi-3 as in Example I, but using 1,3-pentadiene in place of 1,3-butadiene, a copolymer of general structure polyisoprene-polypentadiene-polyisoprene would be obtained. The structure of the polypentadiene would be approximately 85% 1,4-polypentadiene and 15% 1,2-polypentadiene. Cyclization of this copolymer as in Example I should yield a product of general structure cyclized polyisoprene-polypentadiene-cyclized polyisoprene.

EXAMPLE XII

The refractive indexes and specific gravities of several IBI and cyclized IBI triblocks were determined and are shown in Table 13.

TABLE 13
Refractive Index and Specific Gravity of IBI and Cyclized IBI Triblock Copolymers

| IBI Batch$^a$ | % of Original Double Bonds Lost by Cyclization$^b$ | $n_D^{26}$ | Specific Gravity |
|---|---|---|---|
| D | 0 | 1.5186 | — |
| D | 22 | 1.5280 | — |
| D | 34 | 1.5306 | — |
| B | 0 | — | 0.8932 |
| B | 45 | — | 0.9535 |

$^a$Refer to Table 3 for description of IBI.
$^b$By 300 MHz, proton NMR. These data represent loss of double bonds based on total original unsaturation and are due to almost exclusive loss of isoprenyl double bonds.

These data demonstrate that as a result of selective cyclization of IBI block copolymer there is an increase in both refractive index and specific gravity of the product.

EXAMPLE XIII

A diblock copolymer was prepared as in Example IX, but with the addition of diglyme (in a molar ratio of diglyme to 2-BuLi of about 0.4) along with the butadiene to give a "living" polyisoprene-polybutadiene-Li copolymer in which the polyisoprene block contained 94% 1,4-polyisoprene and 6% 3,4-polyisoprene and the polybutadiene block contained 51% 1,2-polybutadiene and 49% 1,4-polybutadiene (Proton NMR data). This "living" copolymer containing medium vinyl polybutadiene block was end-linked with divinylbenzene of Table 12 (divinylbenzene to 2-BuLi molar ratio of 4 to 1) to give a radial block copolymer having an inherent viscosity of 1.25 in toluene. Cyclization of this radial copolymer was carried out in cyclohexane (6 weight %) at 80° C. for 3 hours using 4 phr TiCl$_4$ and a CCl$_3$COOH/TiCl$_4$ molar ratio of 0.4, and the cyclized product recovered as in Example I. A compression molded film of the cyclized copolymer exhibited a tensile strength of 1585 psi (10.9 MPa), 100% modulus of 270 psi (1.9 MPa), and elongation at break of 620%.

EXAMPLE XIV

Another useful embodiment of this invention is vulcanizable new elastomeric compositions which contain cyclized blocks derived from a conjugated diene such as isoprene. For instance, according to the polymerization techniques described in this invention polyisoprene-polybutadiene diblocks or polyisoprene-polybutadiene-polyisoprene triblocks having number average molecular weight of 200,000–300,000 and containing 5–20 weight percent of polyisoprene and 95–80 weight percent of polybutadiene are readily obtained with a lithium catalyst. Cyclization of these block copolymers according to the general procedure of Example III would yield products of general structure cyclized polyisoprene-polybutadiene or cyclized polyisoprene-polybutadiene-cyclized polyisoprene in which the degree of cyclization is dependent upon the reaction conditions. These cyclized block copolymers are readily vulcanizable with conventional sulfur curing recipes. During vulcanization not only the double bonds of polybutadiene should undergo crosslinking but the residual double bonds in cyclized polyisoprene blocks should also participate in crosslinking reactions. Thus, the cyclized polyisoprene blocks of these block polymers become a part of the vulcanizate network and thereby provide novel properties to the resulting vulcanizates. Vulcanization of such cyclized elastomers may be carried out in blends with other vulcanizable rubbers. The elastomeric compositions prepared via the vulcanization of cyclized block copolymers are suited for fabricating rubber goods such as tires, belts, hose, shoes and a variety of molded goods.

EXAMPLE XV

Three diblock copolymers of the general structure polystyrene-polyisoprene were prepared by the stepwise method using 2-BuLi as catalyst and were subsequently converted to radial or star block copolymers by coupling the living diblock copolymers with divinylbenzene. They contained 32, 44 and 55 weight percent styrene. The inherent viscosities and percent gel of these block copolymers are shown in Table 14 along with the corresponding data for a commercially available polystyrene-polyisoprene-polystyrene triblock copolymer containing 14 weight percent of styrene (Kraton 1107, a trademark of the Shell Chemical Company). These four block copolymers were cyclized separately under the following conditions: 10 percent by weight of polymer in dry cyclohexane, 6 phr TiCl$_4$ catalyst, CCl$_3$COOH/TiCl$_4$ molar ratio 0.4, 80° C., 3 hours reaction time. After cooling the reaction product to room temperature, the catalyst was deactivated with methanol and the cyclized block copolymer was recovered by precipitating in 50:50 methanol-acetone containing di-tert-butyl-p-cresol stabilizer. After filtration and drying, all cyclized products were powdery materials. The extents of cyclization (determined by 300 MHz proton NMR), inherent viscosities and percent gel are given in Table 14.

TABLE 14

Cyclization of Linear and Radial Block Copolymers Containing Polyisoprene and Polystyrene Blocks

| ← Before cyclization → | | | ← After Cyclization → | | |
|---|---|---|---|---|---|
| Wt % styrene | Inherent Viscosity, dl/g | Gel, % | Polyisoprene Cyclized % | Inherent Viscosity dl/g | Gel % |
| 14[a] | 1.0 | 1 | 96.1 | 0.24 | 0.2 |
| 32 | 1.05 | 2.4 | 90.5 | 0.26 | 2.1 |
| 44 | 1.2 | 2.1 | 91.5 | 0.29 | 1.9 |
| 55 | 0.95 | 2.5 | 96.2 | 0.24 | 3.0 |

[a]Polystyrene-polyisoprene-polystyrene block copolymer; "Kraton 1107" (a trademark of the Shell Chemical Co)

The above cyclized block copolymers were evaluated as coating resins. Clear, transparent films were obtained when films were cast from 20-25 percent solutions in xylene or glassine paper. These data demonstrate that as a result of the cyclization of polyisoprene blocks in the above block copolymers, the thermoplastic elastomers containing 14 and 32 percent polystyrene and leathery polymers containing 44 and 55 percent polystyrene were converted to soluble, essentially gel free coating resins.

While certain representative embodiments and details have been shown for the purpose of illustrating the invention, it will be apparent to those skilled in this art that various changes and modifications may be made therein without departing from the spirit or scope of the invention.

What is claimed is:

1. A cyclized block copolymer having a number average molecular weight of from about 10,000 to about 300,000 comprised of at least two different blocks, at least one of which blocks is a cyclizable block derived from a conjugated diene monomer of the general structure

wherein,

R$_1$ is selected from a hydrocarbyl group containing one to twelve carbon atoms, R$_2$ is selected from hydrogen or a hydrocarbyl group containing one to twelve carbon atoms; and at least one of which blocks is a non-cyclizable block derived from at least one member selected from the following classes of compounds:

(a) polymers of conjugated diene monomers of the general structure

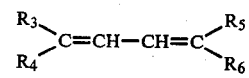

wherein:

R$_3$, R$_4$ and R$_5$ are the same or different and are selected from hydrogen or a hydrocarbyl group containing one to twelve carbon atoms; R$_6$ is selected from hydrogen, a hydrocarbyl group containing one to twelve carbon atoms or a cyano group, (b) polymers of α-methylstyrene, styrene, alkyl or aryl substituted styrenes or halogen substituted styrenes, (c) polymethacrylonitrile, polycaprolactam, polycaprolactone or polydimethylsiloxane, said cyclized blocks constituting about 5-95 weight percent of cyclized block copolymer and said non-cyclized blocks constituting about 95-5 weight percent of cyclized block copolymer.

2. A cyclized block copolymer according to claim 1 which is obtained by subjecting a 1 to 30 percent by weight solution of a block copolymer comprised of at least two different blocks, at least one of which blocks is a cyclizable block derived from a conjugated diene monomer of the general structure

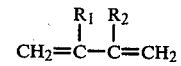

wherein,

R$_1$ is selected from a hydrocarbyl group containing one to twelve carbon atoms; R$_2$ is selected from hydrogen or hydrocarbyl group containing one to twelve carbon atoms; and at least one of which blocks is a non-cyclizable block derived from at least one member selected from the following classes of compounds:

(a) polymers of conjugated diene monomers of general structure

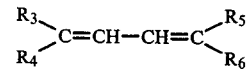

wherein,

R$_3$, R$_4$ and R$_5$ are the same or different and are selected from hydrogen or a hydrocarbyl group containing one to twelve carbon atoms; R$_6$ is selected from hydrogen, a hydrocarbyl group containing one to twelve carbon atoms or a cyano group, (b) polymers of α-methylstyrene, styrene, alkyl or aryl substituted styrenes or halogen substituted styrenes, (c) polymethacrylonitrile, polycaprolactam, polycaprolactone or polydimethylsiloxane, to a cationic catalyst at a concentration of from about 0.1 to about 20 parts by weight per hundred parts by weight of said block copolymer; at a temperature of about 0°–200° C. for a time ranging from about 0.2 to about 25 hours.

3. A cyclized block copolymer according to claim 2 wherein the catalyst is selected from the group consisting of SnCl$_4$, SnBr$_4$, TiCl$_4$, TiBr$_4$, BF$_3$, BCl$_3$, and any of the preceding compounds with a cocatalyst.

4. The cyclized block copolymer according to claim 1 wherein the said cyclizable block is derived from a conjugated diene monomer selected from the group consisting of isoprene, 2,3-dimethyl-1,3-butadiene, 2,3-diethyl-1,3-butadiene, 2,3-di-n-propyl-1,3-butadiene, 2-methyl-3-isopropyl-1,3-butadiene, 2-methyl-3-ethyl-1,3-butadiene, 2-phenyl-1,3-butadiene, 3-methyl-1,3-pentadiene, 3-n-propyl-1,3-pentadiene, 2-ethyl-1,3-butadiene, 2-methyl-1,3-hexadiene, 3-methyl-1,3-heptadiene and 3-butyl-1,3-octadiene and the non-cyclizable block is derived from (a) a conjugated diene monomer selected from the group consisting of 1,3-butadiene, 1,3-pentadiene, 2,4-hexadiene, 1,3-hexadiene, 1,3-heptadiene, 1,3-octadiene, 4,5-diethyl-1,3-octadiene, and 1-cyano-1,3-butadiene and (b) polymers of α-methylstyrene, styrene, alkyl or aryl substituted styrenes or halogen substituted styrenes and (c) polymethacrylonitrile, polycaprolactone, polydimethylsiloxane, or polycaprolactam.

5. A cyclized block polymer according to claim 1 which is a cyclized polyisoprene-polybutadiene-polystyrene triblock polymer (ABC block), in which the weight ratio of A to B to C is about 15–45:about 70–10:about 15–45, respectively.

6. A cyclized block copolymer according to claim 1 which is a cyclized polyisoprene-polybutadiene-polyisoprene triblock polymer (ABA block) in which the weight ratio of A to B to A is about 15–45:about 70–10:about 15–45, respectively.

7. A cyclized copolymer according to claim 1 which is a cyclized polyisoprene-polybutadiene diblock polymer in which the weight ratio of the polyisoprene block to the polybutadiene block ranges from about 5–95 to about 95–5.

8. A cyclized block copolymer according to claim 1 which is a cyclized polyisoprene-polybutadiene-polyisoprene triblock polymer in which the weight ratio of the total polyisoprene blocks to the polybutadiene block ranges from about 95–5 to 5–95.

9. A cyclized block copolymer according to claim 1 which is synthesized by:

reacting a 5 to 15 weight percent solution of a polyisoprene-polybutadiene-polyisoprene block copolymer, with a catalyst selected from the group consisting of SnCl$_4$ with CCl$_3$COOH cocatalyst, TiCl$_4$ with CCl$_3$−COOH cocatalyst and BF$_3$.Et$_2$O at a concentration of from 1 to 10 parts by weight per hundred parts of the polyisoprene-polybutadiene-polyisoprene block polymer, at a temperature of about 25°–100° C., and for a time of from 1 to 16 hours.

10. A cyclized block copolymer according to claim 1 which is derived from a (IB)$_n$-X radial block copolymer wherein I represents polyisoprene block and B represents polybutadiene block and X is a nucleus derived from divinylbenzene coupling agent.

11. A cyclized block copolymer as recited in claim 4 which is derived from a block copolymer whose microstructure has been modified through the use of diglyme in the synthesis of the block copolymer.

12. A cyclized block copolymer according to claim 10 in which the microstructure of the polybutadiene block is modified by the use of diglyme in the synthesis of the copolymer.

13. A cyclized block copolymer as recited in claim 4 in which the microstructure of the cyclizable block is modified by the use of diglyme during the synthesis of the block copolymer.

14. A cyclized block copolymer as recited in claim 4 in which the microstructure of the non-cyclizable block is modified by the use of diglyme during the synthesis of the block copolymer.

15. A cyclized block copolymer having at least two different blocks in which at least one of the blocks is a cyclizable block derived from a conjugated diene monomer of the general structure

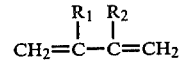

wherein,

R$_1$ is selected from a hydrocarbyl group containing one to twelve carbon atoms, R$_2$ is selected from hydrogen or a hydrocarbyl group containing one to twelve carbon atoms; and at least one of the other block is selected from the group consisting of poly(α-methylstyrene), polystyrene, polymethacrylonitrile, polydimethylsiloxane, polycaprolactone and polycaprolactan.

16. A block copolymer according to claim 15 which is polystyrene-polyisoprene-polystyrene or polystyrene-polyisoprene.

* * * * *

UNITED STATES PATENT OFFICE
CERTIFICATE OF CORRECTION

PATENT NO. : 4,242,471
DATED : December 30, 1980
INVENTOR(S) : Joginder Lal

Page 1 of 2

It is certified that error appears in the above-identified patent and that said Letters Patent are hereby corrected as shown below:

Column 5, line 48, delete "one" and insert therefor --on--

Column 11, lines 7-13, delete the following structural formula:

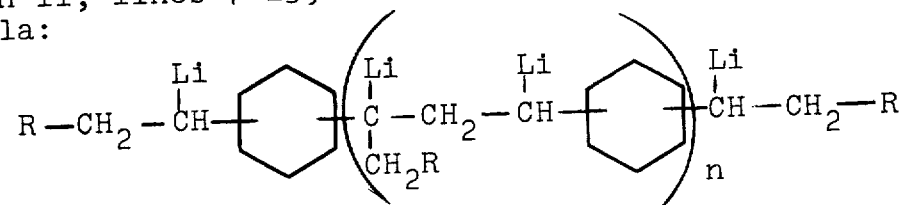

and substitute therefor:

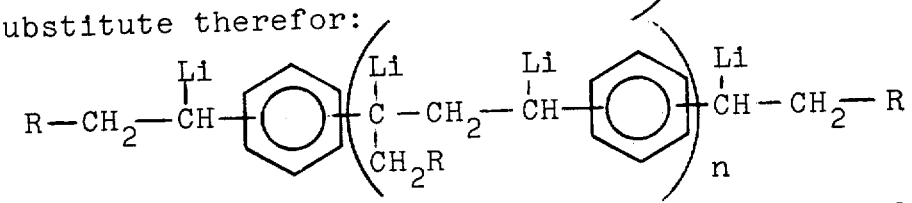

Column 11, Table 1, line 43, delete "15I-70B-15I and substitute therefor --15I-70B-15I--

UNITED STATES PATENT OFFICE
CERTIFICATE OF CORRECTION

PATENT NO. : 4,242,471
DATED : December 30, 1980
INVENTOR(S) : Joginder Lal

It is certified that error appears in the above-identified patent and that said Letters Patent are hereby corrected as shown below:

Column 15, Table 6, line 65, delete "$E_2$" and substitute therefor --$Et_2O$--

Signed and Sealed this

Twenty-ninth Day of May 1984

[SEAL]

Attest:

GERALD J. MOSSINGHOFF

Attesting Officer

Commissioner of Patents and Trademarks